United States Patent [19]
Derkach et al.

[11] Patent Number: 5,689,935
[45] Date of Patent: Nov. 25, 1997

[54] PRODUCT PACKAGE HAVING RELIABLE OPENABILITY

[75] Inventors: William J. Derkach, Lewisville, Tex.; Robert E. Hawkins, Cordova, Tenn.; Bruce Kinsman, McRae, Ark.

[73] Assignees: Recot, Inc., Calif.; Bryce Corporation, Tenn.

[21] Appl. No.: 613,412

[22] Filed: Mar. 11, 1996

[51] Int. Cl.$^6$ ........................................ B65B 61/18

[52] U.S. Cl. .................. 53/412; 53/133.6; 53/553; 53/449; 156/344; 428/43

[58] Field of Search ................... 383/207, 208; 156/344; 428/43; 53/412, 553, 467, 133.6, 449

[56] References Cited

U.S. PATENT DOCUMENTS

| | | | |
|---|---|---|---|
| 2,260,064 | 10/1941 | Stokes | 53/449 |
| 3,559,800 | 2/1971 | Butler | 383/208 |
| 3,939,972 | 2/1976 | Mayworm | 428/43 |
| 5,196,247 | 3/1993 | Wu et al. | 428/43 |
| 5,409,772 | 4/1995 | Yabusa et al. | 156/344 |
| 5,443,877 | 8/1995 | Kramer et al. | 428/43 |

Primary Examiner—John Sipos
Assistant Examiner—Gene L. Kim
Attorney, Agent, or Firm—Jones, Day, Reavis & Pogue

[57] ABSTRACT

A plastic packaging material which, when formed as a package having seams, will provide a predictable line of failure along a seam when the package is opened to prevent the package from tearing down the side. The predictable failure path is provided through a lamination process involving specific resins or blends of resins laminated in three (or more) layers in which an extruded inner layer forms a weak inner bond wholly within that inner layer to create the predictable line of failure and in which the process of forming the material does not inhibit processing speed, efficiency, and economics of materials used to provide this reliable openability.

2 Claims, 4 Drawing Sheets

5,689,935

PRODUCT PACKAGE HAVING RELIABLE OPENABILITY

BACKGROUND OF THE INVENTION

1. Field of the Invention

The present invention relates in general to product packaging and in particular to a plastic material for forming a good product package having a predictable line of failure when the package is opened to prevent tearing of the bag down the body of the bag. This predictable failure path is provided through a coextruded lamination manufacturing process involving specific resins or blends or resins coextruded in three or more layers that do not inhibit processing speed, efficiency, and economy of materials used to provide this reliable openability.

2. Description of Related Art Including Information Disclosed Under 37 CFR 1.97 and 1.98

Laminated films produced for making food packages are based on multiple layers of plastic film each with a specific purpose. An outer web is designed to move across a packaging machine, another web provides heat stability to prevent distortion when the package is sealed, still another provides the ability to obtain a uniform print surface, and yet another provides the ability for the laminated film to be adhered to an adhesive used to bond the laminated film to an adjacent film. When more than two film webs are used to form a laminated film, these core film webs provide additional specific properties such as moisture vapor transfer rate, gas barrier, and appearance. This part of the lamination has nothing to do with the openability of the lamination in package form. The inner web of a lamination can contribute barrier qualities, optics, and sealability, and yet provide openability that varies from "impossible" to "easy open".

Thus, a prior art bag so constructed is illustrated in FIG. 1 wherein the bag 10 is shown filled with product and sealed. It has a longitudinal seal 12 and end seals 14 and 16. The bag is generally made as indicated in FIG. 2 by forming essentially a cylindrical tube 18 with a longitudinal seal 12 and with a horizontal seal at the lower end thereof along seal 16 as shown in FIG. 3. The package can then be filled with product when constructed as shown in FIG. 3 and sealed as illustrated in FIG. 4 to form a bag filled with product having upper and lower sealed ends 14 and 16, respectively, and a longitudinal side seal 12.

The problem with these bags is illustrated in FIG. 5. When the bag is to be opened and forces are applied in the direction of arrows 24 and 26 to the upper seal 14, and bag may start to open at 26 and then tear downwardly into the side of the bag as illustrated at 28. This is not a serious problem for small bags of food products because the contents of the small bag can be eaten entirely. However, with large bags containing large amounts of food products, the tear 28 prevents the bag from being reclosed to protect the contents therein; thus the contents must be transferred to another container that can be sealed to protect the freshness of the product. The reason that such bags tear as shown in FIG. 5 is because of their construction and the interlaminar strength at each interface of the lamination. A history and description of such bag construction is helpful.

COATED FILMS

Prior to extrusion lamination with a thermoplastic adhesive, adhesives were, and still are, based on a single or two-part adhesive which "cures" to a hard bond that is very difficult to separate. With this type of adhesive, openability of a package had to be built into the inner film. The inner film's primary purpose is sealability in order to provide integrity to the package. Openability was based on either a coating on the inner film that acted as the sealant or a coextrusion film or a thin sealant ply that separated from the inner film when the package was opened. While these methods did provide "openability", it was inconsistent and varied with the temperature of the sealing jaws, sealant ply thickness when using a coextrusion film, and with the adhesion of the coating to the inner film due to primer or treatment variations. In addition, there was a narrow hot tack (ability to keep end seals together at the hot conditions necessary to obtain a seal) and seal range with coextruded inner films. The same problems occurred with coated film if the film treatment and/or primer weight/drying was too low.

OPP FILMS

Because of cost competition, the use of coextruded oriented polypropylene films (OPP) began to replace coated films. These new films, which were and are typically two and three-layer coextrusions of homopolymer polypropylene as a core and copolymer/terpolymer skins, did not, and do not, provide consistent openability of packages without tearing of the package when it is opened. As the need for larger packages with multiple usage has expanded, the failure of packages based on laminations with oriented polypropylene coextrusions films as the inner web became unacceptable. Therefore, a solution was needed to provide reliable openability of these larger packages along a predetermined path without tearing of the package down the side when it is opened.

With the change from coated sealant films or a dissimilar thermoplastic skin such as Surlyn® coextruded with polypropylene that has some degree of openability due to bit-in fracture or delamination lines to a coextruded polypropylene film that has poor openability, tearing the package is a serious problem. The increase in large packages with multiple use needs has made tearing of the package when opening unacceptable.

PROBLEMS TO OVERCOME

A process to produce a usable (opening without tearing) extrusion based lamination between an inner sealant film and an adjacent outer film in two-ply laminations, or the core film in a three-ply lamination must provide negligible loss in processing efficiency and yield loss and also enable the use of cost effective resin components to be commercially feasible. For example, if an extrusion process typically runs at 1200 ft/min, it is impractical to use a similar extrusion process that, while making a usable product, runs at 300 ft/min. In addition, the ability to produce product that has a flat profile across the web cannot be compromised by a product that meets end use requirements but has poor profile and results in poor machine performance at the end user. Also, extrusion laminating of polypropylene films (typically one web is printed) requires polypropylene films with surface treatment and/or modification with other resins to provide a surface to which polyethylene can obtain adhesion. Polyethylene, when extruded, has a non-polar surface unless it is extruded at a sufficiently high temperature and is exposed sufficiently to air through what is called an air gap (gap between the extrusion die lips and the extrusion nip) in order to provide sites which can be bonded to similar sites on polypropylene film surfaces. In addition, primers are typically used to provide adhesive to the inks on the inner surface of one of the films to be laminated. If any of the polyethylene extrusion parameters are not at a specific level, poor adhesion of the lamination will result. This manifests itself as a delamination at one or both of the film interfaces. Because of the critical nature of the polyethylene extrusion process and the speed at which the lamination process occurs (typically 1000–1500 ft/min) the bond strength at the inner surfaces of the polypropylene films must be strong and flexible to obtain a level of adhesion that provides usable handling during distribution of filled packages.

Because of the need for reliable bond strength between the polypropylene films in a polyethylene lamination and the seal strengths of coextruded polypropylene films, it is difficult for a lamination using a polypropylene sealant film to provide consistent, reliable openability within the film layers or interfaces of the lamination.

Thus, consider the lamination of a prior art film as shown in FIG. 6. The lamination consists of outer polypropylene film layer 30 with treated surface 31, ink layer 32, primer layer 34, if needed, polyethylene extrudable adhesive layer 36, a sealable polypropylene film 38 with treated surface 39 and with copolymer or terpolymer sealant 40. It should be noted that outer layer 30 can be any acceptable plastic packaging film and that inner layer 38 can be any sealable plastic packaging film such as coex film, coated film, or metallized film.

Primer 34 is used to provide strong adhesion of the inks to the outer ply of the extrudate 36. It also provides additional strength between the treated polypropylene film surface 31 and the extrudate 36. A primer serves two main functions, i.e., 1) It helps to provide an uncontaminated surface so that the extrudate 36 will rapidly spread and uniformly web out.

2) The primer joins both the ink 32 and substrate 30 to the extrudate 36 by a covalent bond, hydrogen bond, van der Waals force, dipole interaction, or some mixture of these effects. The ability of the primer to increase the number of reactive sites on the substrate and maximize intermolecular attraction is important with non-polar surfaces such as inks, marginally treated surfaces, or treated surfaces that may have some surface interference over the treated areas. There are inks and polypropylene surfaces that do not require a primer for acceptable end product use but a primer is frequently used to maximize adhesion and provide the ability to operate at higher laminator speeds. In the case of the present invention, a primer may or may not be used, but in the preferred product, it is used to maximize adhesion to the inks.

Continuing with FIG. 6, the sealable polypropylene film 38 is approximately 0.70 mil and, when this package layer is sealed to the opposing package layer, the 0.70 mil sealant film 38 fuses to the adjacent 0.70 mil film and results in approximately 1.40 mils of film forming the entire seal.

When the package is opened, the inner film fractures starting at a point on the lower edge of the seal interface as shown at 42. The fracture can then proceed through the 0.70 mil polypropylene film layer 38, through the polyethylene extrudable adhesive layer 36, the primer 34 (if present), through the ink layer 32, and into the outer polypropylene film 30 which, of course, allows the bag to split down the side. When the bond strength of the lamination is high enough to provide a usable lamination for normal distribution, the tendency is for the applied force shown by arrows 24 and 26 in FIG. 5 to break to the weakest point and split down the lamination or through the total lamination because of a lack of a consistent failure path within the lamination which, itself, has very low tear strength. Any irregularities in the seal such as a foldover can cause the splitting to occur much easier.

FIG. 7 illustrates a second prior art bag lamination structure with the ink on the inside of the film. Again, with this construction, when the package is opened, the inner film 54 fractures starting at a point on the lower edge of the seal interface as shown at 58. The fracture can then proceed as indicated by arrow 60 through the 0.70 mil oriented polypropylene inner film 54 and treated surface 55 to the ink, and through the ink layer 52 itself, into the polyethylene adhesive 58 and through the primer 50 (if present), into the outer polypropylene treated interface 47, and then into the outer polypropylene film 46 itself. Again, the interlaminar bond strength of the lamination is high enough to provide a useful lamination for normal distribution, the tendency is for the applied force, shown by the arrows 24 and 26 in FIG. 5, to break to the weakest point and split down the lamination or through the total lamination because of the lack of a consistent failure path within the lamination which itself has a very low tear strength.

Because of this, it would be desirable to have a plastic product bag having a seal that includes a predictable line of failure when the package is opened.

REQUIREMENTS OF THE INVENTION

The present invention discloses a food product package film having a seal to provide a predictable line of failure when a package is opened. This predictable failure path is provided through a coextruded lamination manufacturing process involving specific resins or blends of resins coextruded in three or more layers that do not inhibit processing speed, efficiency, and economy of materials used to provide this reliable openability.

In order to obtain strong adhesion, the inner and outer films must have treatment on the inner surfaces facing the polyethylene outer plys of the three ply extrudate. Treatment of the laminating side of the polypropylene film provides bonding sites to which similar bonding sites on the polyethylene outer plys of the extrudate can bond.

For example, the outer plys of a three layer extrudate based on polyethylene/polypropylene/polyethylene, provide chemically reactive sites such as carbonyl and hydroxyl groups that will bond to similar groups on the polypropylene treated surface by a mixture of covalent bonds, hydrogen bonds, van der Waals forces, dipole interaction, or a mixture of these effects. The reaction sites on the polyethylene outer surfaces are formed because of the temperature of extrusion (600°–620° F.) and oxygen in the air.

However, the inner plys of the extrudate, i.e., polyethylene to polypropylene, because they are not exposed to air have these chemical bonding sites at a negligible level. The result is that bonding at these interfaces is weak and depends upon the flexible nature of the resins used and the mechanical pressure of the lamination process to provide adhesion. This adhesion level with essentially untreated non-polar interfaces is in the 20–50 gms/in range. This would typically be considered non-functional, but in this novel process, the combined lamination with strong functional bonds at all other interfaces provides a finished product capable of withstanding all required finished product needs.

1. The Performance Requirements

The resin or resins used to bond inner polypropylene sealant film and the adjacent fill (a core in a three-ply lamination and an outer fill in a two-ply lamination) must provide inner laminar adhesion comparable to what is attainable with extrudable polyethylene resin.

A core layer in a coextrusion process that provides a reliable failure path and opening must be extrudable at normal operational speeds and must provide final coextrusion gauge profile comparable to what is obtainable with a polyethylene resin extrudate.

A resin that provides the above predictable failure path in a coextrusion must be extrudable at a temperature that will allow it to be coextruded with a typical extrusion grade polyethylene resin, i.e., 0.917 density/3.5–18 melt index (MI). Finally, this resin must not impart objectionable odor or color and must be stable to extrude.

With the understanding that, for a package to be opened, fracture of the inner sealant polypropylene film (oriented or cast) is the initiation of failure, the concept is to insure that a predictable failure mode occurs at a specific interface such as the inner film/ink (when ink is at the inner film interface), within the ink at the inner film/extrudate interface in unprinted areas, at the ink/primer/extrudate interface, within the extrudate, and at the extrudate to outer film interface.

2. Discussion of Potential Problems in Providing a Predictable Failure Mode When a Package is Opened.

Because of the lack of flexibility of the inks used to print films, failure can and frequently does occur at the ink interface when opening. The same failure may occur within the ink itself. However, over 20 years of production experience demonstrates that this is not a consistent predictable failure path. In order to compensate for the poor-to-fair adhesion of inks to a polyethylene extrudate, a primer is required. Normally this is a polyethyleneimine based primer. It has been shown that the strength obtained at the ink/inner film and within the ink film itself is too high to enable acceptable in-use performance such that a reliable failure path will be provided. The result is that the force applied to open a package fractures the inner film and failure at the ink/inner film or ink interface does not consistently occur because bond strength is not consistent or reliably low.

Further, with the existing ink formulation/primers, it is impracticable to obtain adhesion to the ink interface with a polyethylene extrudate that provides openability and handling resistance. Without a primer to provide functional bonds of the ink to the polyethylene extrudate, the package will not withstand in-use handling. An alternative is to use coextrudable adhesive copolymer resins or formulated resins that, because of their chemical nature, will adhere to the ink and film portions of the inner film. However, the nature of these resins is that they are costly, require extrusion at temperatures low enough to prevent degradations of the adhesions promoting resins thus minimizing adhesion of the total extrudate to the outer web of the lamination, do not promote good profile, and have odors that can be unacceptable for food packaging applications. In addition, most of these resins require longer dwell time, that is, they need pressure and time for maximum adhesion, and are thus not suited for extrusions at speeds in the 1000–1500 ft/min range. Another disqualification is that, while they may have what is considered good adhesion to ink or films, they may not withstand handling of the finished package due to a lack of flex resistance at the ink interface.

Concerning the polyethylene extrudate, due to the flexible nature of the extrudate, it is impossible to make the failure occur within this ply of the lamination.

Further, it is not possible to insure that the failure mode will occur at the interface between the polyethylene extrudate and the outer film because the bond strength of the polyethylene extrudate to the outer film in a lamination must be strong enough to insure handling ability in package form during distribution. Thus the mode of failure can occur at any or a combination of interfaces or through the whole lamination. At any of these points the opening force exerted can cause tear propagation to occur at right angles to the seal as shown in FIGS. 6 and 7.

SUMMARY OF THE INVENTION

The present invention provides a predictable line or path of failure when the package is opened. This predictable failure path is provided through a manufacturing process involving specific resins or blends of resins coextruded in at least three layers that does not inhibit manufacturing processing speed, efficiency, and economy of materials used to provide reliable openability.

A coextrusion extrudate has been developed that will provide substantially consistent failure within the extrudate while at the same time maintaining the economy and performance of polyethylene as the primary extrudate in the lamination manufacturing process. It provides no change in machine performance during the packaging operation and provides substantially consistent openability by the consumer.

The novel results are obtained by using a coextrusion based on a polyethylene/polypropylene/polyethylene extrudate.

The concept is not limited to the use of high pressure low density polyethylene (LDPE) as one or both of the extrudate layers encapsulating the polypropylene core. Typically the LDPE resins usable in this process have a melt index from 2.0 to 35.0 and a density from 0.88 to 0.965. A preferred polyethylene low density resin has a melt index from 3.5 to 17.0 and densities from 0.914 to 0.926. A polyethylene resin may be manufactured by either a high or low pressure polymerization process.

Linear low density polyethylene coating grades similar to Dow 3010 or Quantum GS-550 can be used in this process.

The process is not limited to homopolymer polypropylene core resins since different degrees of openability can be obtained by using copolymer polypropylenes or blending homopolymer polypropylene with other polypropylenes or polyethylene as the core resin. The core can also be based on nylon, PET, EVOH, and the like to arrive at the desired opening strength.

An essential part of this concept is that the polyethylene can be one or more of the outer plys of the extrudate. The dissimilar melt temperatures of polyethylene and polypropylene (or polypropylene resin and blends with specific other adhesion-enhancing resins) provide the clean mode of failure. The flexible nature of polyethylene provides the handleability needed in the finished lamination for normal handling of the finished package.

It is possible to increase the bond strength between the core and the outer polyethylene extrudate layers by blending EMA resins (example Chevron 2207) up to 35% by weight.

A significant part of this concept is that it be an extrusion lamination. By using this process it is possible to maintain the seal strength and hot tack of the whole inner film and, when opening the package, drive the failure point to specifically occur at the coextrusion laminate interface. In laminations using curing-type adhesives, this concept is not possible because of the strong bonds that occur between the plys of the lamination.

It is possible to provide openability using a coextruded inner sealant film with specific failure points but the limitation in hot tack, seal range, and economics of making the film are not as consistent and reliable as the concept set forth above.

The nature of easy-opening interlaminar failure provides for use of sealant films not normally usable for each opening. For example: Cast polypropylene or films with unusual linear characteristics such as high density polyethylene or crystalline high-moisture barrier polypropylene film may be used.

Thus it is an object of the present invention to provide an easy-opening product plastic bag that generally does not tear down the side of the bag when a seam is opened.

It is another object of the present invention to provide a product bag formed of plastic that has a seal in which is provided a predictable line of failure when the package is opened.

It is still another object of the present invention to provide a predictable failure path in a good product package through a coextruded lamination manufacturing process involving specific resins or blends or resins coextruded in three or more layers.

It is yet another object of the present invention to provide a good product bag having a predictable line of failure in a seal and which seal can be formed through coextrusion in a manner that does not inhibit processing speed, efficiency, or economics of material sued to provide this reliable openability.

Thus the present invention relates to a plastic material for forming a product package having a sealed seam along which a substantially predictable line of failure occurs when the package is opened. The plastic material comprises first and second outer layers of plastic film material and a third extrudate layer of plastic material interposed between and bonded to the first and second outer layers, the third extrudate layer having characteristics such that a line of weakness is formed wholly within the extrudate that tears easier than the first and second outer layers and forms a substantially predictable line of failure wholly within the plastic extrudate material, the line of failure occurring during opening a package when a separating force is applied to the sealed seam.

The invention also relates to a product package formed of plastic and having a substantially predictable line of failure along an elongated seam that opens the package when forces are applied to the elongated seam. The package comprises a plastic body portion having a substantially enlarged portion for containing the product. Sealed edges are formed on both ends of the body portion. The body portion is formed of a laminate using an extrudate adhesive layer laminated between an inner sealant plastic film layer and an outer plastic film layer. A sealant is formed on the inner surface of each end of the plastic body portion for joining two edges and closing each end of the package. The extrudate may be formed of polyethylene/polypropylene/polyethylene having different melt temperatures for forming the predictable line of failure along the interface wholly within the extrudate between the polypropylene and the polyethylene without tearing down the side of the bag.

The invention also relates to a process for forming a material used to create a product package having edges forming a sealed seam along which a substantially predictable line of failure occurs when force is applied to the edges of the seam. The process comprises the steps of providing first and second outer layers of plastic material, and extruding a third layer of plastic extrudate in an interposed relationship between the first and second outer layers of plastic material to form a multilayer lamination, the third layer having specific internal adhesion characteristics such that a line of weakness is formed wholly within the extrudant that tears easier than the first and second outer layers and forms a substantially predictable line of failure along a package seam formed by sealing edges of the plastic material, the line of failure opening the package when a separating force is applied to the sealed edges without tearing the side of the bag under normal opening forces being applied.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENTS

Figure 1:
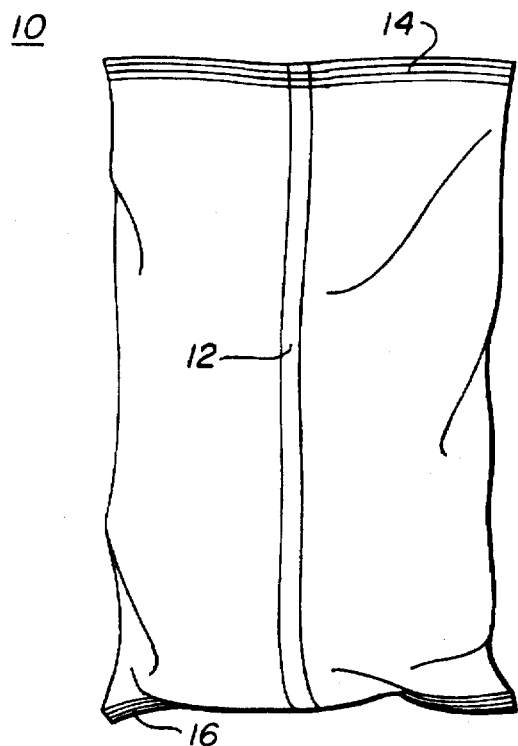
FIG. 1 is a diagrammatical representation of a product package that is sealed on both ends.
Figure 5:
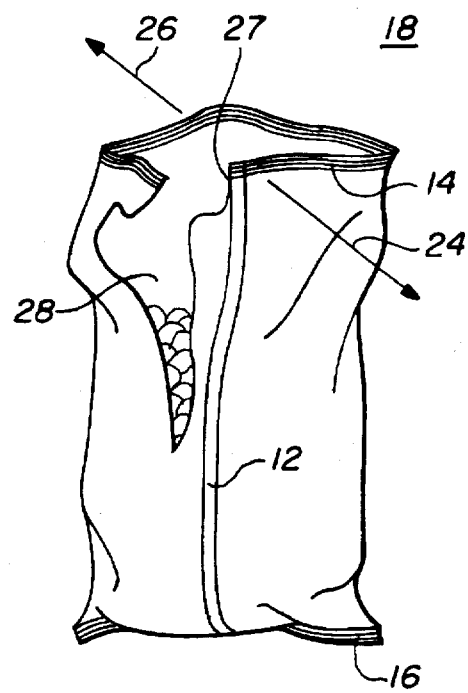
FIG. 5 is a schematic representation of a prior art bag tearing down the side when forces are applied to the top seam to open the bag.
Figure 2:
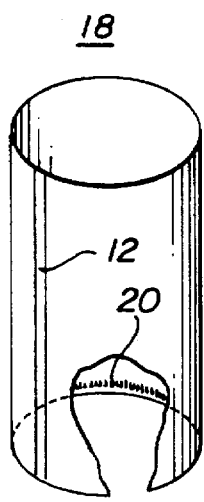
FIG. 2 is a schematic representation of a plastic film rolled to a cylindrical form preparatory to forming a product bag.
Figure 3:
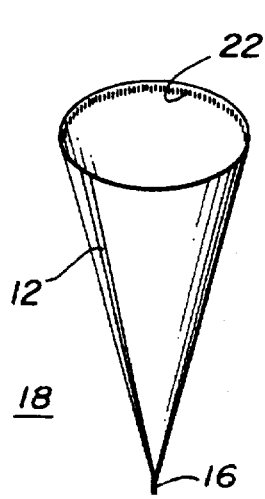
FIG. 3 is a schematic representation of the lower end of the cylindrical film illustrated in FIG. 2 being sealed before product is place in the bag.
Figure 4:
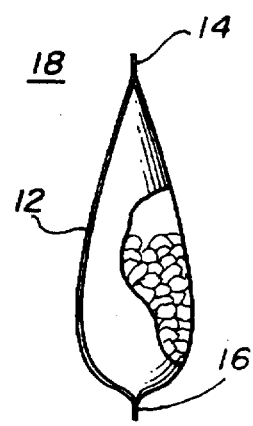
FIG. 4 is a schematic representation of the bag of FIG. 3 having product therein and being sealed at the top portion.
Figure 6:
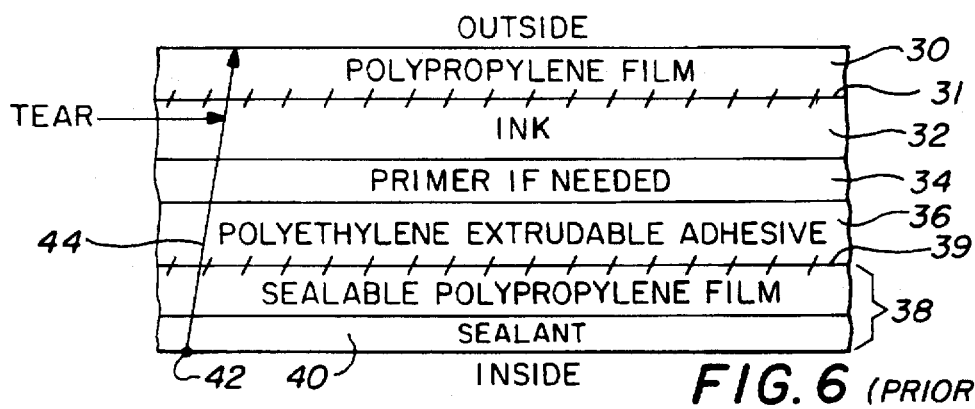
FIG. 6 is a representation of a prior art laminated package film which is so constructed that a tear may occur through to the outside and down the side of the bag.
Figure 7:
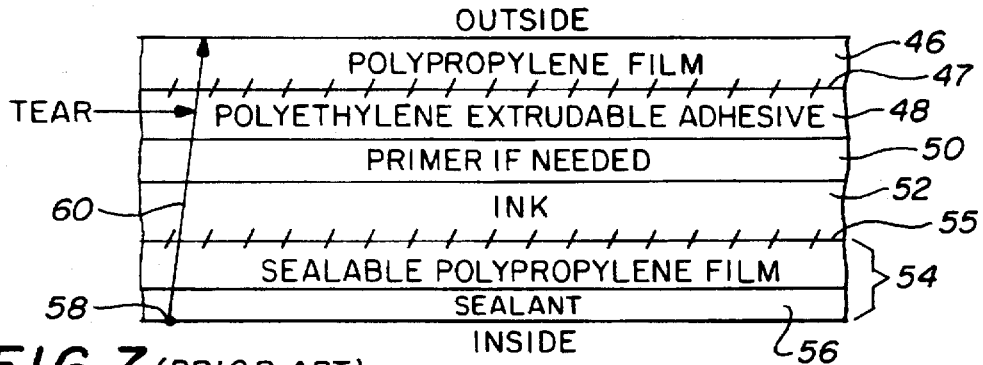
FIG. 7 is a representation of a prior art film layer similar to that in FIG. 6 except that the ink is on the inside of a polyethylene film.
Figure 8:
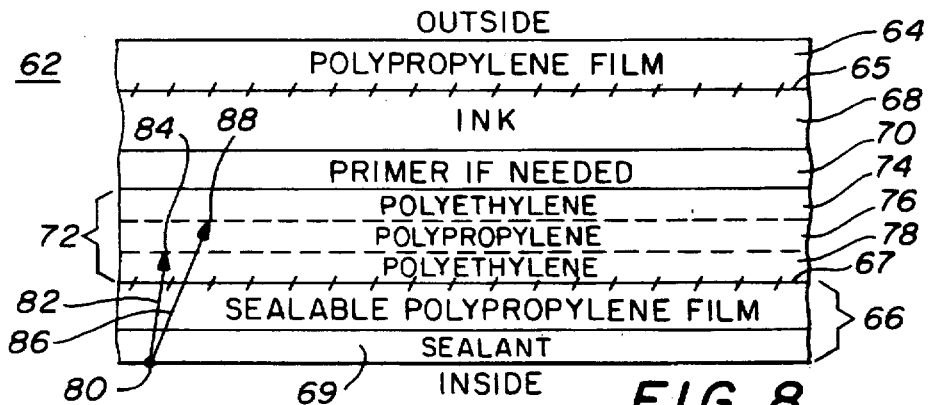
FIG. 8 is a schematic representation of the novel film of the present invention illustrating outer polypropylene layers separated by a multilayer extrudable adhesive composed of polyethylene/polypropylene/polyethylene to form a predictable line of failure wholly within the extrudate when the bag is opened.

FIG. 8 is a schematic representation of a packaging film of the present invention that will allow easy opening of a package by providing a substantially consistent line of failure within the package seal. As can be seen in FIG. 8, the film 62 includes an outer polypropylene film layer 64 and an inner sealable polypropylene film layer 66. An ink layer 68 and primer layer 70 may be added as needed.

The novel ability to provide a substantially consistent failure line is provided by the multilayer separately extrudable adhesive 72 that includes polyethylene layer 74, polypropylene layer 76, and polyethylene layer 78. The dissimilar melt temperature of the polyethylene 74, 78 and the core polypropylene 76 or polypropylene resin blends (with specific other adhesion enhancing resins such as EMA) provides the clean mode of failure wholly within the extrudate 72. Further, the flexible nature of polyethylene and polypropylene provides the handling ability needed in the finished lamination for normal handling of the finished package. Thus a tear may begin at the point designated by the numeral 80 and spread into the inner layer 66 along any particular path such as paths 82 or 86. When the tear following path 82 passes through the polypropylene layer 78, the line of failure will tend to occur at the weak interface 84 between the polypropylene layer 76 and the polyethylene layer 78. The interface 84 is weak because of the different melt temperatures of the polypropylene 76 and the polyethylene 78. Should, however, the tear proceed along a different path 86 and manage to extend through the polypropylene layer 76, it will encounter the interface 88 between the polypropylene layer 76 and the polyethylene layer 74 which, again, is a weak area along which the tear can occur at interface 88. Again, the different melting temperatures of the polyethylene 74 and the polypropylene 76 form the weak interface 88. In either case, the tendency will be for a tear to occur wholly within the extrudate 72 along a substantially consistent line of failure on either side of the polypropylene layer 76 and prevent the tear from proceeding through the polyethylene layer 74, the primer and ink layers 68 and 70, and the outer polypropylene film layer 64. Such, of course, prevents the bag from tearing down the side since the tear never reaches the external surface but follows the substantially predictable lines of failure along interfaces 84 and 88 wholly within the multilayer extrudate 72.

Thus FIG. 8 illustrates the film layer 62 that utilizes a coextrusion lamination having a polyethylene/ polypropylene/polyethylene extrudate between an inner sealant film 66 of preferably oriented polypropylene or cast oriented polypropylene and an outer film 64, preferably a polypropylene, in a three-ply lamination that will provide consistent package openability at a specific failure point wholly confined between the polyethylene and the polypropylene interfaces of the extrudate layer 72.

It should be noted that the invention is not limited to two outer film layers separated by an extrudate layer but could include multiple layer combinations.

Figure 9:
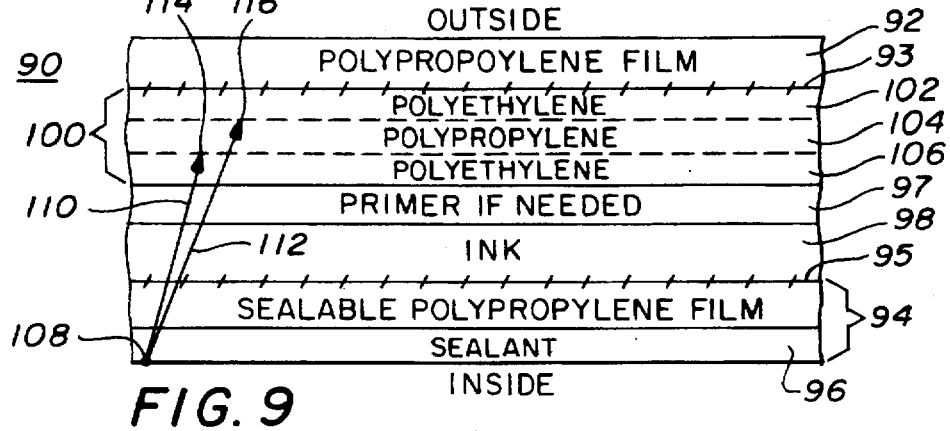
FIG. 9 is a schematic representation similar to FIG. 8 except that the ink is on the inside of the multilayer extrudable adhesive.

FIG. 9 is an alternate embodiment in which the multiple layer film 90 comprises an outside polypropylene layer 92 and an inside sealable polypropylene film 94 including sealant 96. The primer 97, is needed, and ink 98 may be placed on the sealable polypropylene film 94 as shown. The novel multilayer extrudable adhesive 100, comprising polyethylene layer 102, polypropylene layer 104, and polyethylene layer 106 is extruded between the polypropylene film 92 and the primer 97. Again, when a tear occurs at a weak spot 108 along the sealable polypropylene film 94, it may generate along any one of several paths such as 110 and 112 into the interior of the film layer 90. It may pass through the ink layer 98, the primer layer 97, and polyethylene layer 106 as shown by arrow 110. However, when it reaches the weak interface 114 between the polypropylene layer 104 and polyethylene 106, it tends to propagate along this interface because it is a specifically designed line of failure because of the different melt temperatures of the polypropylene layer 104 and the polyethylene layer 106. If the tear does happen to propagate along the path 112 so that it extends through the polypropylene layer 104, it will again strike a layer 116 of weakness that will cause the separation of the layers to occur along the interface 116 which is the line of weakness or designed line of failure. Thus, again, the predictable line of failure lies wholly within the extrudate 100.

It is to be understood that different degrees of openability can be obtained by using a blend of polypropylene homopolymers and other homopolymer propylene or copolymer polypropylenes, and polyethylene, or other blends of these resins may be formed as the core in the polyethylene/polypropylene blend/polyethylene coextrusion thereby controlling openability of a finished package in a coextrusion lamination.

It should also be understood that this concept is not limited to the use of high pressure LDPE as one or both of the extrudate layers encapsulating the polypropylene core. Typically the LDPE resins usable in this process have a melt index from 2.0 to 35.0 and a density from 0.88 to 0.965. The preferred polyethylene low-density resins have a melt index from 3.5 to 17.0 and densities from 0.914 to 0.926. The polyethylene resins may be manufactured by either a high or low-pressure polymerization process. Linear low-density polyethylene coating grades similar to Dow 3010 or Quantum GS-550 can be used in this process.

The use of ethylene methyl acrylate copolymers such as Chevron 2207 can be blended into the polyethylene outer ply for selective adhesion to the inner surfaces of the lamination. The EMA copolymer can be blended up to 35% by weight into the polyethylene resin used as the outer plys of the coextrusion.

One of the polyethylene skins or layers can be based on a different polyethylene resin or blend to enhance the overall strength of the laminate, i.e., toughness, puncture, and the like.

Figure 10A:
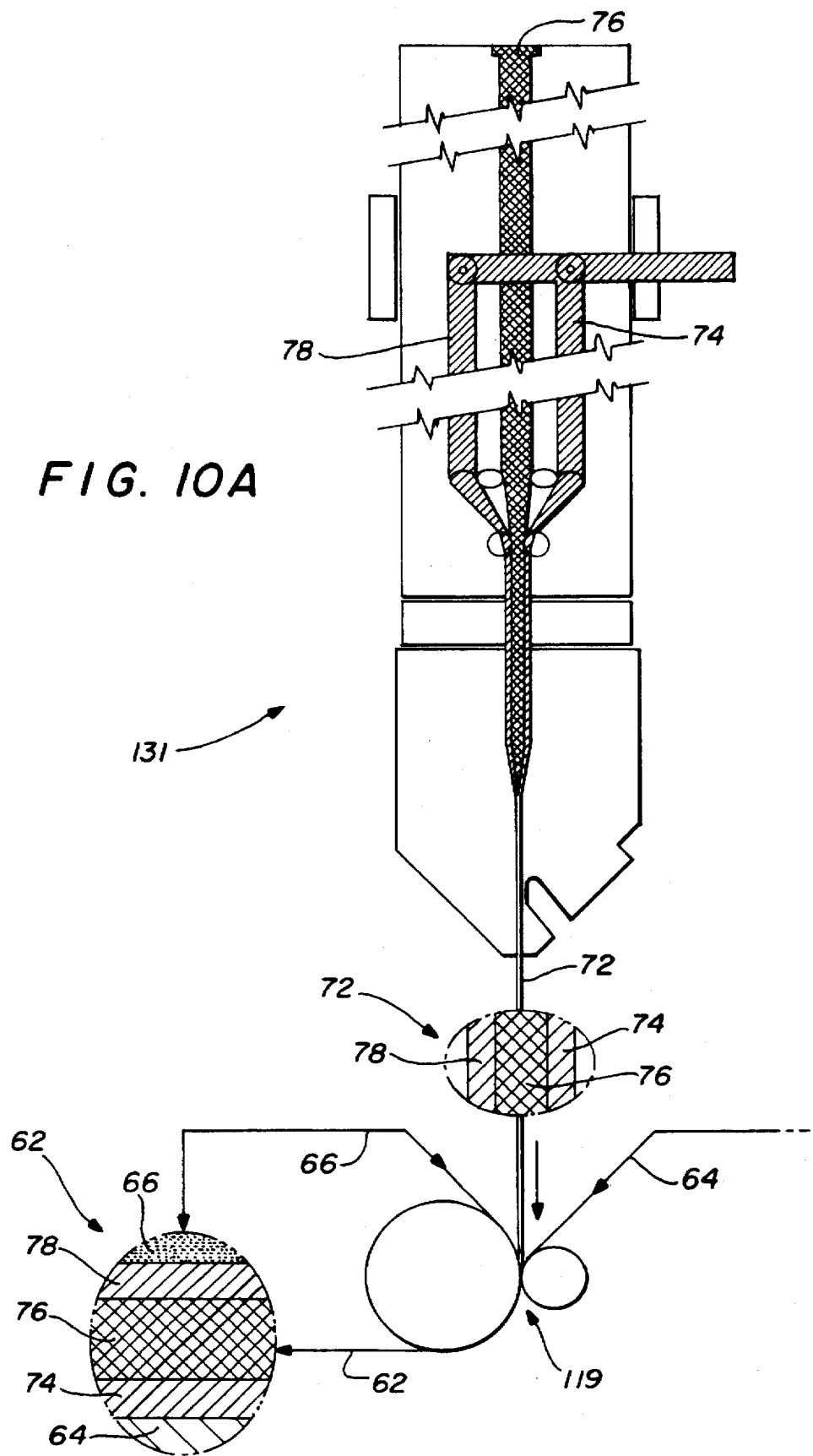
FIGS. 10A and 10B are diagrammatic representations of the extrudation process of the present invention.

FIG. 10A is a schematic representation of the extrusion process by which the polyethylene/polypropylene/ polyethylene extrudate adhesive novel ply in FIG. 8 or in FIG. 9 is formed. The actual resin extruding devices are well known in the art and typically are based on a combining adapter/die 131 where the extrudate melts are combined into one extrudate with specific layers. Thus as can be seen in FIG. 10A, the novel film layer 62, is composed of two outer polyethylene extrudates 130 and 132 and an inner polypropylene core 138 all of which are extruded and then laminated between the laminating rollers 119.

The extrudate 62 is separately formed of the polyethylene layer 130 and polyethylene layer 132 coming from common (shown) or separate die extruders. The polypropylene layer 138 is coextruded from one extruder (not shown) and is between polyethylene layers 130 and 132 which are produced by another extruder (not shown). The extrudate 62 is then laminated with the polypropylene layers 120 and 122 through lamination rollers 119.

Figure 10B:
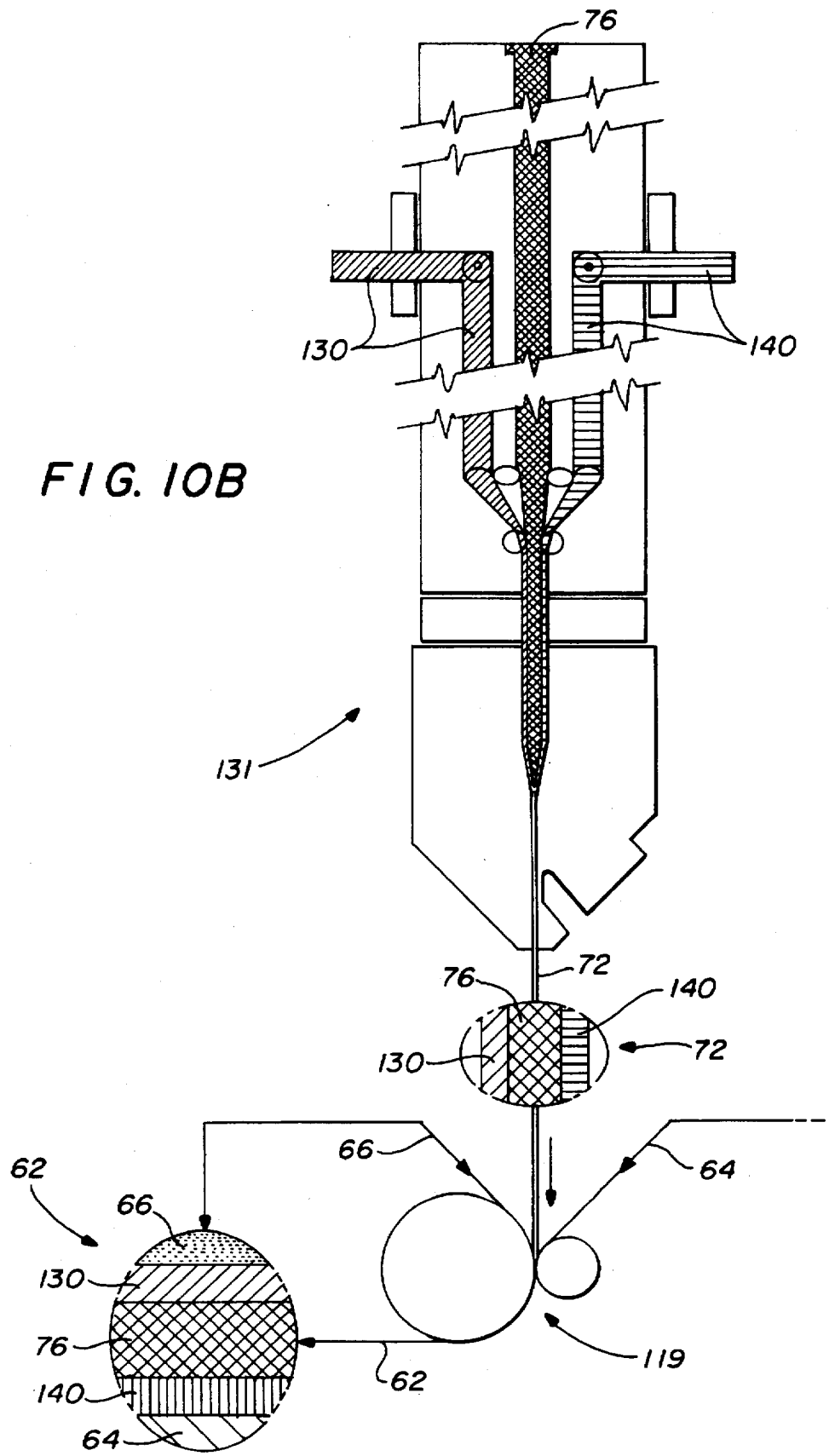

As can be seen in FIG. 10B, other polyethylene resins or blends 140 can be used as one of the polyethylene layers for selected adhesion and for enhancement of the physical properties of the finished lamination such as for instance, a barrier layer, puncture resistance and the like.

The use of ethylene methyl acrylate copolymers such as Chevron 2207 can be blended into one or more of the polyethylene outer plys for selective adhesion to the inner surfaces of the lamination. The ethylene methyl acrylate copolymer can be blended up to 35% by weight into the polyethylene resin used as the outer plys of the core.

The results of a first test series using the novel film is shown in Table I. It compares package openability without tearing of both prior art laminations and the novel laminated product. The basis of the test is the openability of 100 packages of each test group using typical opening force. The outer film, inner film, and inks are the same on the Prior Art and Novel laminations. The difference between prior art test material I and II is a target of 10 and 7 #/ream total extrudate weight and the gauge of the outer and inner films. The total extrudate weight in the prior art samples is polyethylene. In tests I and II of the novel material of the present invention, a three-layer coextrusion of low density polyethylene is used as the two outer plys with a core of polypropylene in the novel samples. It will be seen that 83 and 87 bags of the prior art tore down the side of the bag while with the present invention, only 2 and 3 bags out of the 100 samples tore down the side of the bag.

TABLE I

| TYPE STRUCTURE | PRIOR ART I | PRIOR ART II | NOVEL I | NOVEL II |
| --- | --- | --- | --- | --- |
| Polypropylene Outer Film (Gauge) Extrudate | 75 | 100 | 75 | 100 |
| Outer Layer | 10 #/Ream Total Polyethylene | 7 #/Ream Total Polyethylene | 4.0 #/Ream Poly-ethylene | 2.5 #/Ream Poly-ethylene |
| Core | 10 #/Ream Total Polyethylene | 7 #/Ream Total Polyethylene | 2.0 #/Ream Poly-propylene | 2.0 #/Ream Poly-propylene |
| Outer Layer | 10 #/Ream Total | 7 #/Ream Total | 4.0 #/Ream Poly- | 4.0 #/Ream |

TABLE I-continued

| TYPE STRUCTURE | PRIOR ART I | PRIOR ART II | NOVEL I | NOVEL II |
| --- | --- | --- | --- | --- |
| Primer | Polyethylene Yes | Polyethylene Yes | ethylene Yes | Yes |
| Ink | Ink | Ink | Ink | Ink |
| Inner Polypropylene Film (Gauge) | 70 | 120 | 70 | 120 |
| # of Packages Tearing | 83 | 87 | 2 | 3 |
| # of Packages Not Tearing | 17 | 13 | 98 | 97 |
| % of Openability w/o Tearing | 17% | 13% | 98% | 97% |

Concerning the novel I and II structures of the present invention shown in Table I, two pounds/ream is the preferred target polypropylene core weight but weights as low as 1.0 #/ream are acceptable. There is no limit on the upper polypropylene weight as long as a continuous polyethylene layer is present on each side of the polypropylene. The distribution of the outer polyethylene layer does not have to be symmetrical, but it is critical for consistent package durability that a continuous polyethylene layer be present on each side of the polypropylene cord. For example, a polyethylene/polypropylene/polyethylene distribution in #/ream of 1.0/2.0/9.0, 9.0/2.0/1.0, 3.0/2.0/7.0 will all provide acceptable results. If the polyethylene is absent from the side of the extrudate facing the print, the package handling resistance is not acceptable.

Table II illustrates the results of a second test series in which comparison of the openability of prior art laminations based on films with tear resistance poorer than those used with the normal prior art product are compared to the same laminations utilizing the novel extrusion lamination process of the present invention. Percent openability is based on 100 packages tested.

TABLE II

| TYPE STRUCTURE | PRIOR ART I | PRIOR ART II | PRIOR ART III | NOVEL I | NOVEL II | NOVEL III |
| --- | --- | --- | --- | --- | --- | --- |
| Outer Film (Gauge) | 80 Ga. High Barrier OPP | 75 OPP | 75 OPP | 80 Ga. High Barrier OPP | 75 OPP | 75 OPP |
| Total Extrudate | 10 #/ream | 10 #/ream | 10 #/ream | 10 #/ream | 10 #/ream | 10 #/ream |
| Outer | Polyethylene | Polyethylene | Polyethylene | 4 Polyethylene | 4 Polyethylene | 4 Polyethylene |
| Core | Polyethylene | Polyethylene | Polyethylene | 2 Polypropylene | 2 Polypropylene | 2 Polypropylene |
| Inner | Polyethylene | Polyethylene | Polyethylene | 4 Polyethylene | 4 Polyethylene | 4 Polyethylene |
| Primer | Yes | Yes | Yes | Yes | Yes | Yes |
| Ink | Ink | Ink | Ink | Ink | Ink | Ink |
| Inner Film (Gauge) | 70 Sealable OPP | 80 Ga. High Barrier Sealable OPP | 1.0 mil Sealable Cast Polypropylene | 70 Sealable OPP | 80 Ga. High Barrier Sealable OPP | 1.0 mil Sealable Cast Polypropylene |
| # of Packages Tearing | 99 | 100 | 92 | 2 | 2 | 4 |
| # of Packages Not Tearing | 1 | 0 | 8 | 98 | 98 | 96 |
| % Openability w/o Tearing | 1% | 0% | 8% | 98% | 98% | 96% |

Note that when the standard 80 gauge high barrier film is used as the outer or inner layer in the prior art processes I and II, extremely poor package openability was obtained because of the fragile nature of the high barrier film. Thus, 99 and 100 of the 100 bags in each test tore down the side when opened. Table II shows in novel processes I and II that the same film can be used with the present novel process with an extremely high degree of success. As can be seen, only 2 and 2 of the 100 bags in each test tore down the side. Thus, the novel process allows the use of standard films that normally provide poor performance in bag openability. The prior art process III uses an inner film that make bag opening extremely difficult due to high seal strength. In that test, 92 of the 100 bags tested tore down the side of the bag. Novel process III of the present invention uses the same inner film but provides a line of weakness wholly within the extrudate layer that enables easy opening of the bags without tearing the body of the bag. As can be seen, only 4 of the 100 bags tested tore down the side.

Table III shows the results of a third test series that demonstrates the effect of polypropylene core weight on openability and sets forth the weight of polypropylene in the total extrudate. Fifty packages were tested for openability on each test series. Note that excellent results were obtained over a wide range of such weights. However, the worst results were obtained with a polypropylene core weight below 1.0.

We claim:

1. A method of forming a package of a plastic product, the package having a substantially predictable line of failure along an elongated seam that opens the package when force is applied to the elongated seam, the method comprising the steps of:

forming a plastic body portion having a substantially cylindrical shape and having opened ends;

forming said body portion of a laminate using a polyethylene/polypropylene/polyethylene extrudate laminated between an inner sealant plastic film layer and an outer plastic film layer;

sealing the inner surface of one end of the body portion to form a package with a seam closing the one end of the package prior to a product being inserted therein; and sealing the inner surface of the other end of the body portion to close the package with a second seam after product is inserted therein, the polyethylene and polypropylene in the extrusion laminate having different melt temperatures to form said predictable line of failure along the interface between said polyethylene and said polypropylene said line of failure opening said package when a separating force is applied to said second seam without tearing down said outer plastic film layer.

2. The method of claim 1 further copy the steps of:

TABLE III

| Type Structure | 1 | 2 | 3 | 4 | 5 | 6 | 7 | 8 | 9 | 10 |
|---|---|---|---|---|---|---|---|---|---|---|
| Outer Polypropylene Film (Mils) | 75 OPP | 75 OPP | 75 OPP | 75 OPP | 75 OPP | 75 OPP | 75 OPP | 75 OPP | 75 OPP | 75 OPP |
| Extrudate | 10 #Total | 10 #Total | 10 #Total | 10 #Total | 10 #Total | 7 #/Ream | 7 #/Ream | 7 #/Ream | 7 #/Ream | 7 #/Ream |
| Polyethylene Outer | — | — | — | — | — | — | — | — | — | — |
| Polypropylene Core | 0.5–0.7 | 1.0–1.6 | 2.0–3.0 | 4.0–6.5 | 7.0–8.5 | 0.5–0.9 | 1.0–1.6 | 2.0–3.0 | 4.0–7.0 | 8 |
| Polyethylene Outer | — | — | — | — | — | — | — | — | — | — |
| Primer | Yes | Yes | Yes | Yes | Yes | Yes | Yes | Yes | Yes | Yes |
| Ink Inner | — | — | — | — | — | — | — | — | — | — |
| Polypropylene Film (Mils) | 70 | 70 | 70 | 70 | 70 | 70 | 70 | 70 | 70 | 70 |
| # of Packages Tearing | 10 | 3 | 1 | 0 | 0 | 11 | 2 | 0 | 0 | 1 |
| # of Packages Not Tearing | 40 | 47 | 49 | 50 | 50 | 39 | 49 | 50 | 50 | 50 |
| % Openability | 80% | 94% | 98% | 100% | 100% | 78% | 96% | 100% | 100% | 98% |

While the invention has been described in connection with a preferred embodiment, it is not intended to limit the scope of the invention to the particular form set forth, but, on the contrary, it is intended to cover such alternatives, modifications, and equivalents as may be included within the sphere and scope of the invention as defined by the appended claims.

forming said polyethylene in said extrudate of low density or linear low density polyethylene having a melt temperature in the range from about 212° F. to 270° F.; and selecting said separating polypropylene layer in said extrudate to have a primary melt temperature in the range from about 310° to about 340° F.

* * * * *